(12) United States Patent
Dippenaar et al.

(10) Patent No.: US 9,411,982 B1
(45) Date of Patent: Aug. 9, 2016

(54) ENABLING TRANSFER OF DIGITAL ASSETS

(71) Applicant: Amazon Technologies, Inc., Reno, NV (US)

(72) Inventors: Andries Petrus Johannes Dippenaar, Cape Town (ZA); Frans Adriaan Lategan, Gauteng (ZA)

(73) Assignee: Amazon Technologies, Inc., Reno ( * ) Notice: Subject to any disclaimer, the term of this patent is extended or adjusted under 35 U.S.C. 154(b) by 365 days.

(21) Appl. No.: 13/961,725

(22) Filed: Aug. 7, 2013

(51) Int. Cl.
*G06F 21/60* (2013.01)
*G06F 21/62* (2013.01)

(52) U.S. Cl.
CPC ............ *G06F 21/6245* (2013.01); *G06F 21/60* (2013.01)

(58) Field of Classification Search
CPC ......... G06F 21/30; G06F 21/62; G06F 21/60; G06F 21/6245
See application file for complete search history.

(56) References Cited

U.S. PATENT DOCUMENTS

| 5,675,649 | A  | * | 10/1997 | Brennan | H04L 9/085 380/286 |
| 8,418,237 | B2 | * | 4/2013 | Barbour | G06F 21/40 726/19 |
| 2007/0223706 | A1 | * | 9/2007 | Gantman | G06F 21/34 380/286 |
| 2008/0080526 | A1 | * | 4/2008 | Gounares | H04L 41/50 370/401 |
| 2012/0016803 | A1 | * | 1/2012 | Tharp | G06Q 50/01 705/319 |

* cited by examiner

*Primary Examiner* — Saleh Najjar
*Assistant Examiner* — Devin Almeida
(74) *Attorney, Agent, or Firm* — Hogan Lovells US LLP

(57) ABSTRACT

Techniques for managing digital assets are described that enable a principal to designate a plurality of users that will gain access and ownership of the principal's account that contains the various digital assets of the principal in the event of a transfer of assets. The account may be a network accessible account that maintains various digital assets of the principal, such as multimedia, applications, virtual machines, data, and others. In the event of a transfer, access to the account can be controlled by a cryptographic secret, where each of the designated users has been provided with a distinct share (part) of the cryptographic secret. A minimum number of shares of the secret are required before access to the principal's account will be granted. The minimum number may be configured by the principal in advance.

15 Claims, 8 Drawing Sheets

ENABLING TRANSFER OF DIGITAL ASSETS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources (e.g., virtual machines, block data storage, etc.) through the cloud, and thus does not have to purchase and maintain the hardware and/or software needed. For example, customers may store various digital assets (such as documents, photos, music, videos, applications) on resources of a service provider, from whom the customers may have purchased at least a subset of those assets, and the service provider may enable the customers to access their assets at any time they wish using a network connection, such as the Internet. In some cases, the customers of the service providers are individuals, while in other cases, the customers are corporations or other business entities.

While customers are generally allowed to access their digital assets at any time, there is significant uncertainty regarding the question of what happens to those assets at the time when the customer no longer exists. For example, if an individual owner of the account dies or if the company that is the owner of the account is acquired or dissolved, it can be unclear as to what happens to the digital assets in the account. Conventionally, the accounts continue to be accessible using the same credentials as before and may eventually be deactivated due to long periods of non-use or the expiration of one or more payment instruments, among other such actions. The assets can have monetary value, such as items having significant intellectual property, and/or emotional value, such as photo albums or home movies. It therefore can be desirable to provide a way to more efficiently manage the transfer of assets associated with the account during such events.

BRIEF DESCRIPTION OF THE DRAWINGS

Various embodiments in accordance with the present disclosure will be described with reference to the drawings, in which.

DETAILED DESCRIPTION

Figure 1:
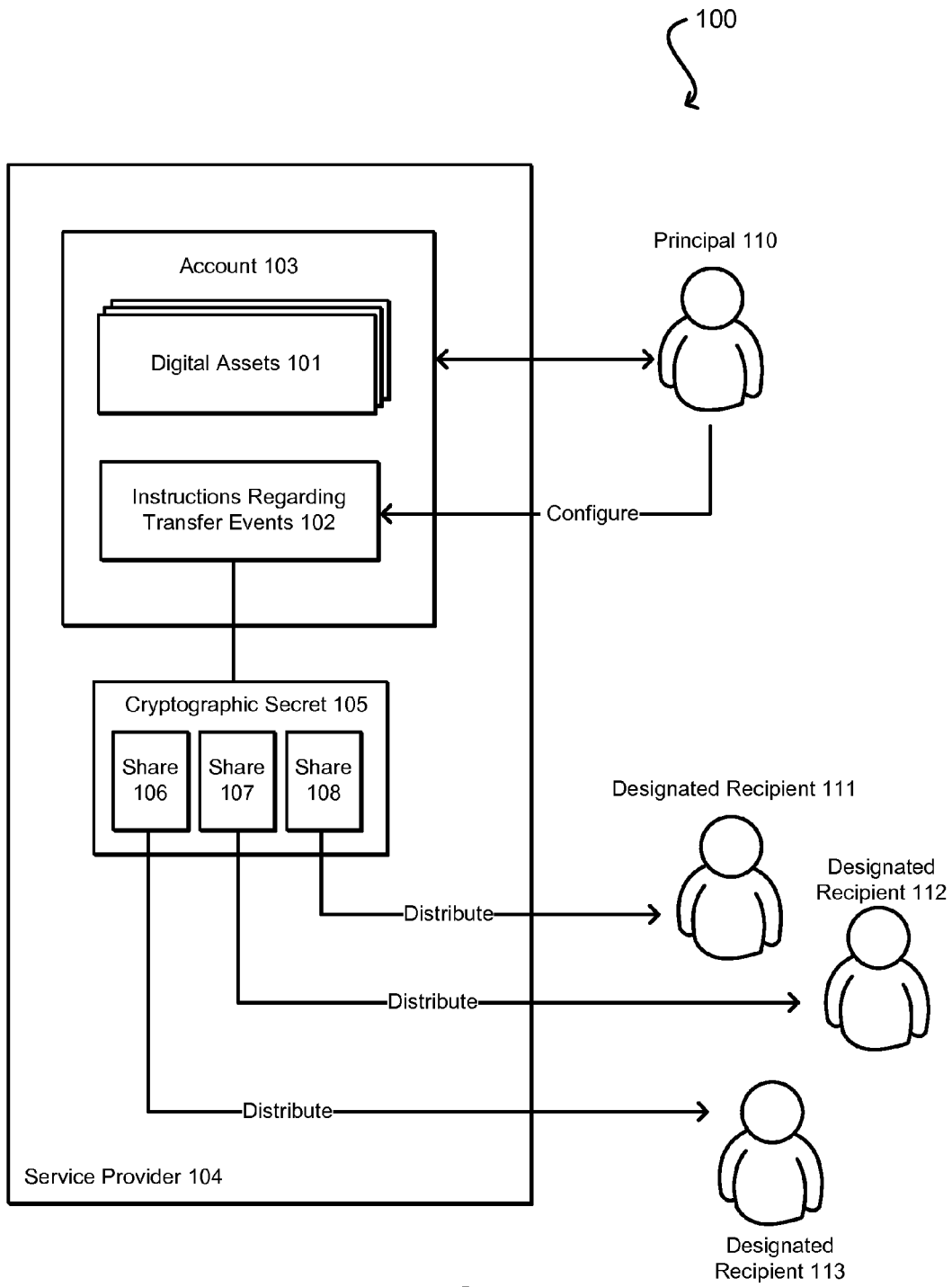
FIG. 1 illustrates an example of a principal configuring the asset management system, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for transferring and bequeathing assets, such as digital assets accessible over a network. In particular, an asset management system is described that enables a principal (e.g., owner of an account) to designate a plurality of users (i.e., recipients) that will gain access and ownership of the principal's account that contains the various digital assets of the principal in the event of a transfer of assets (e.g., the principal's death if the principal is an individual or the dissolution or acquisition if the principal is a business entity). The account may be a network accessible account that maintains various digital assets of the principal, such as multimedia (e.g., photos, videos, music, etc.), applications, virtual machines, data, and others. In the event of a transfer, access to the account can be controlled by a cryptographic secret, where each of the designated users has been provided with a distinct share (part) of the cryptographic secret. A minimum number of shares of the secret are required before access to the principal's account will be granted. The minimum number may be configured by the principal in advance. For example, the principal may distribute the shares of the cryptographic secret to five designated users (e.g., family members) and specify that at least three of the five shares are required before access to the account will be granted by the service provider. In this manner, an individual is able to ensure that their online digital assets are transferred according to the individual's wishes, while reducing the likelihood that one other person misappropriates the assets in the account. Similarly, if the principal is a business entity, the online digital assets of the entity may be transferred to another entity in the event of an acquisition or dissolution of the entity.

In various embodiments, the asset management system described herein can be implemented by a service provider (e.g., cloud computing provider) that offers a multitenant computing environment for a plurality of customers that rent or lease the resources of the service provider to maintain their digital assets. As used herein, the term "digital asset" should be broadly construed and includes any resource that can be electronically maintained on behalf of a principal and is accessible over a network. Examples of digital assets include but are not limited to documents, images, videos, music (e.g., MP3 files), applications, virtual resources, databases and the like. The service provider can maintain the digital assets for the principal in an account associated with the principal that the principal can access using one or more credentials (e.g., username and password).

In various embodiments, the principal configures their account (e.g., effectively creates an electronic "will and testament") by designating a number of other users that will be required to gain access to the account in the event of a transfer of assets (e.g., death, dissolution, acquisition, etc.). A cryptographic secret is generated to control access to the account in the event of a transfer of assets. The cryptographic secret is divided into a plurality of distinct shares and each share can be distributed to a designated user. For example, the cryptographic secret can be implemented using Shamir's secret sharing algorithm (or other secret sharing/splitting algorithms), where a secret is distributed amongst a group of participants, each of whom is allocated a share of the secret. The secret can be reconstructed only when a sufficient number, of possibly different types, of shares are combined together; individual shares are of no use on their own. In various embodiments, the principal can designate which recipients will receive a share of the secret and can also specify the minimum number of shares that will be required before the account is made accessible to the recipients. In some embodiments, the shares are distributed to the designated recipients. In other embodiments, the shares of the secret are maintained on the servers of the service provider until the recipient requests their particular share of the secret. The shares may also be encrypted using a private key owned by each recipient, such that only the designated recipient can access their respective share of the secret.

In various embodiments, when a transfer event is determined, the service provider may activate the shares of the secret and require that the minimum number of shares be received from the designated recipients before granting access to the principal's account. For example, if the service provider determines that the principal is an individual that is recently deceased (e.g., by examining legal documents, etc.), the service provider may consider this a transfer event. Similarly, if the service provider obtains sufficient legal documentation that the principal is an entity that is recently dissolved or acquired by another entity, the service provider may treat this as a transfer event. During a transfer event, the service provider my wait to receive the minimum number of shares of the cryptographic secret before granting access to the principal's account.

FIG. 1 illustrates an example 100 of a principal configuring the asset management system, in accordance with various embodiments. As shown in the illustration, a service provider 104 maintains accounts for each customer of the service provider. Each account, such as account 103 is associated with a principal 110 (e.g., owner) of the account 103. The accounts may contain one or more digital assets 101, such as multimedia (e.g., images, video, music), documents, data, applications and the like. During the setup of the account 103, the principal 110 may configure the account 103 with instructions 102 to be used during any event of asset transfer. As used herein, the terms "asset transfer" and "transfer event" should be broadly construed and can include any event during which the principal has specified that ownership of at least a portion of the assets of the account should be transferred to one or more designated users. Examples of transfer events include but are not limited to death, acquisition, sale, dissolution, or liquidation of the principal. In some embodiments, the transfer event can be determined by inspecting the appropriate legal documentation or other proof of the event by a person (e.g., administrator) or by an automated component such as an application.

In various embodiments, access to the account 103 is controlled using a cryptographic secret 105 that is divided into a plurality of shares or parts. When the principal 110 configures the instructions 102 for the account 103, the principal 110 may specify the number of the shares that the secret 105 should divided up into and may also specify the minimum number of shares that will be required before access to the account is granted in the event of an asset transfer. In some embodiments, the principal might not provide the instructions through the system, but might instead specify instructions or intent through an external document or source, such as a will or transfer agreement. In such a case, a party such as an executor or related party might provide the instructions to the system. These instructions might require specific documentation in at least some embodiments, such as a copy of the will or transfer agreement, information about the intended recipients, etc.

Once the instructions 102 have been received from the principal 110, or another appropriate party, a cryptographic secret 105 can be generated. As mentioned above, the cryptographic secret is divided into a number of shares specified by the principal 110, such as shares 106, 107, 108. In some embodiments, the cryptographic secret 105 is generated according to Shamir's secret sharing algorithm. The Shamir's secret sharing algorithm is well known in the art and involves a number of shares of the secret being distributed amongst a group of participants, each of whom is allocated a share of the secret. Access to the account is only granted when a sufficient number (i.e., minimum number specified by the principal) of possibly different types of shares are combined together. In other embodiments, other forms of secret sharing or secret splitting algorithms can be utilized within the scope of the present disclosure.

In one embodiment, once the cryptographic secret 105 has been generated, the shares (106, 107, 108) of the cryptographic secret are distributed to a plurality of recipients (111, 112, 113) designated by the principal 110 of the account 103. Each share may be encrypted and/or digitally signed prior to distributing the share to the recipient. For example, the share may be encrypted using a private key of the recipient of the device, such that no other party can obtain access to the share of the secret without the private key. Once the encrypted share has been distributed to the recipient, the share and the private key may be deleted by the service provider 104 to prevent a potential compromise of the encryption key and/or share.

In another embodiment, the shares (106, 107, 108) of the cryptographic secret 105 can be maintained by the service provider on behalf of the designated recipients (111, 112, 113). As before, the shares may be encrypted using private keys of the respective recipients. The shares may be stored in a secure database or secure storage server maintained by the service provider 104, such as within a resource center of a service provider, as will be described in further detail later in this disclosure.

In some embodiments, once the shares (106, 107, 108) have been distributed to the designated recipients (111, 112, 113), the principal 110 may choose to revoke one or more of the shares. For example, the principal 110 may choose to revoke the share 108 of the secret distributed to the recipient 111. In various embodiments, a share may be revoked without having to re-issue a new secret and without affecting the other shares of the secret. Therefore, the principal 110 may revoke share 108 without affecting the validity of shares 106 and 107.

In some embodiments, once the shares (106, 107, 108) have been distributed to the designated recipients (111, 112, 113), the principal 110 may choose to add new shares to the secret and new recipients that should receive those shares. For example, if the principal is an individual that gives birth to a child, the principal may choose to add the child to the list of recipients that have a share of the secret. The adding of new shares may be implemented without disrupting the remaining shares and without having to modify and/or re-distribute the remaining shares.

Figure 2:
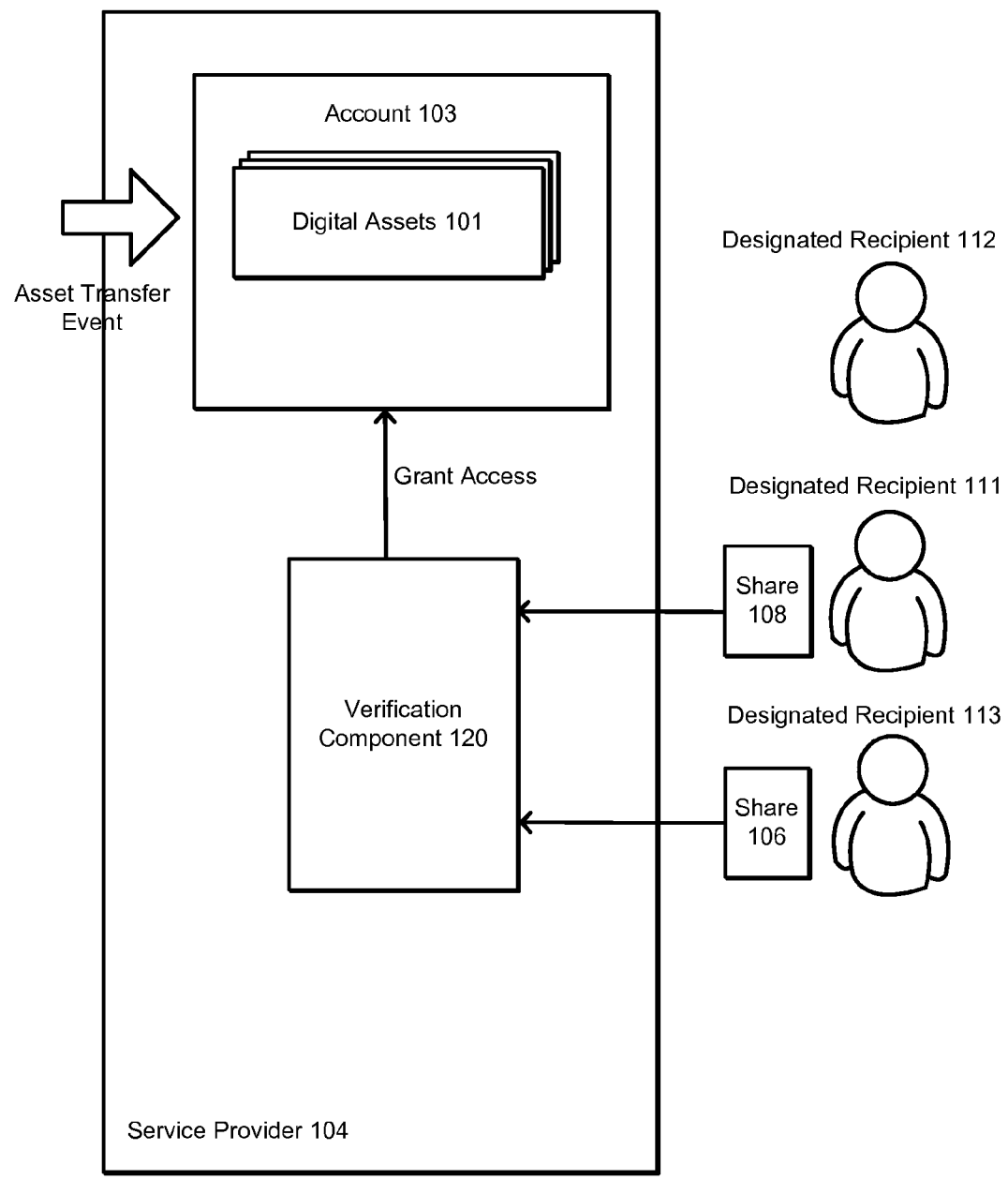
FIG. 2 illustrates an example of a transfer event occurring for an account of a principal, in accordance with various embodiments.

FIG. 2 illustrates an example 200 of a transfer event occurring for an account of a principal, in accordance with various embodiments. As shown in the illustration, the service provider 104 may determine that a transfer event has occurred for the account 103. As previously described, the transfer event can be determined by inspecting the appropriate legal documentation or other proof of the event by a person (e.g., administrator) or by an automated component such as an application.

Once the transfer event is determined by the service provider 104, the shares of the secret may be activated and the one or more of the recipients (111, 112, 113) may submit a request to obtain access to the account 103 of the principal. If a verification component 120 (e.g., hardware, software or combination thereof) determines the minimum number of shares of the secret have been received, the service provider 104 may grant the requesting users access to the account 103. For example, as shown in the illustration, the designated recipients 111 and 113 may provide their respective shares 108 and 106 and request access to the account 103. If the principal had configured the account 103 such that the minimum number of required shares is two of the three total shares, the service provider 104 may grant access to the account even in the event if the remaining recipient (112) has not provided their share. Although the illustrations shown in FIGS. 1 and 2 show three recipients, it will be evident to one of ordinary skill in the art that any number of shares and recipients may be utilized within the scope of the various embodiments described herein. For example, the principal may configure the account with a cryptographic secret divided into 10 shares where only 3 of the 10 shares are required to gain access to the account. Similarly, any other permutations of total number of shares and the minimum number of shares can easily be utilized. Furthermore, in some embodiments, the principal may specify that each and every share of the secret (e.g., minimum number is 10 out of 10 total shares) is required before access is granted. In some embodiments, a recipient might be given more than one share, such that fewer other recipients need to provide a share in order for that recipient to gain access. In the case of a will, for example, an executor might receive one or more of the shares, such that the executor must provide at least one share in order for any of the other recipients to gain access. In other embodiments, the executor might have a separate secret that must also be provided in order for a recipient to gain access. Other approaches to controlling access by specific parties can be utilized as well within the scope of the various embodiments.

In some embodiments, once the service provider 104 receives a request to access the account, the service provider 104 may start a timeout period during which the service provider attempts to contact the principal 110 of the account 103. This action may be taken in order to validate the transfer event and to prevent any malicious users from gaining access to the account. For example, the service provider may generate an email message to the email address of the principal and determine whether the principal has responded with a response, or whether there was a "bounce back" message, or the like. In other embodiments, the service provider 104 may attempt a financial transaction, such as a deposit or withdrawal of a monetary amount with an financial account (e.g., bank account, credit card, etc.) of the principal. Any failures of such financial transactions may be treated as evidence that the principal is deceased or is no longer in existence. If the service provider does not receive any response during the timeout period, the service provider may proceed with the verification and grant access to the account if the minimum number of shares is received.

Figure 3:
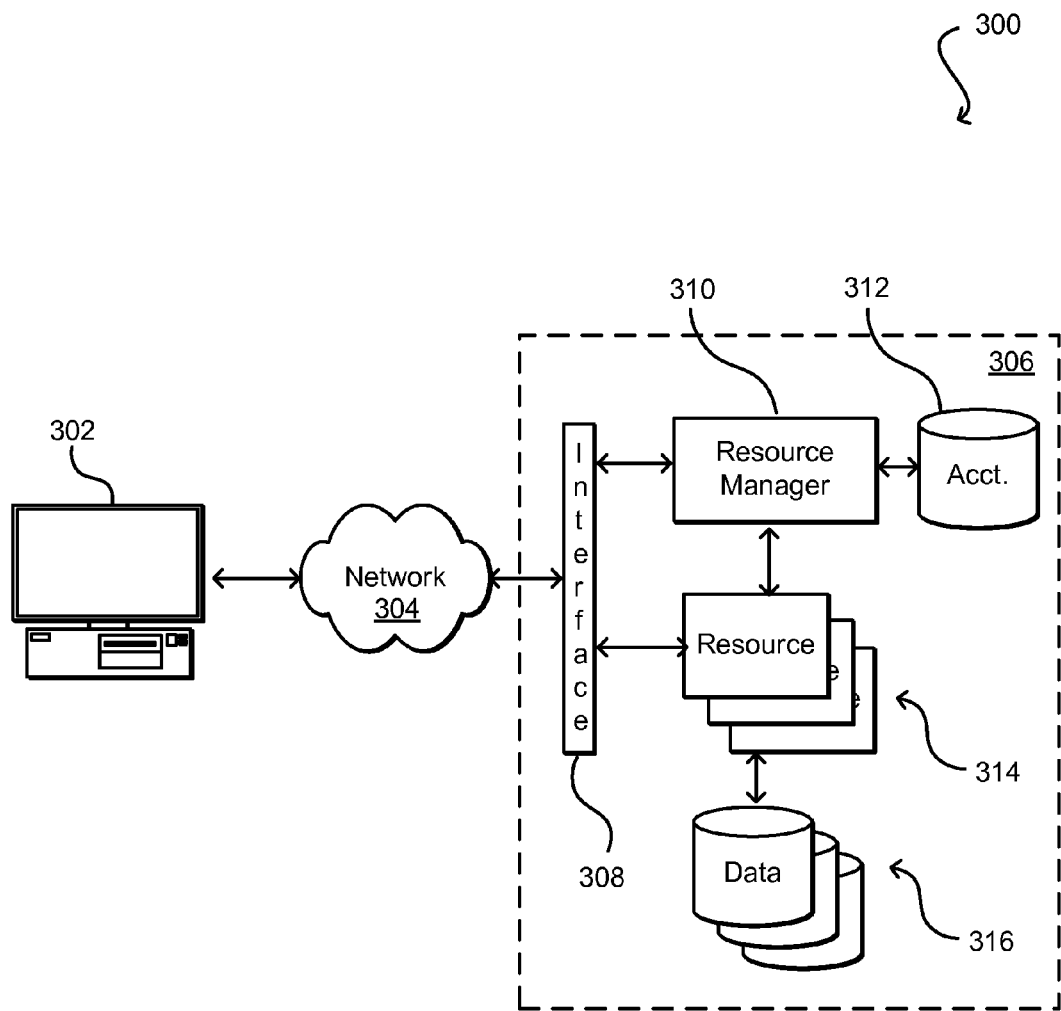
FIG. 3 illustrates an example multitenant environment maintained by the service provider in which aspects of the various embodiments can be implemented.

FIG. 3 illustrates an example multitenant environment 300 maintained by the service provider in which aspects of the various embodiments can be implemented. In this example a customer of a multi-tenant and/or shared resource virtualized computing environment 306 is able to utilize a client device 302 to submit requests across at least one network 304 to at least one designated address or interface of the environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The virtualized computing environment 306 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the service provider of the virtualized computing environment that contains the digital assets of the customer, indicates which resources or types of resources the customer can access, an amount of that access, types of tasks that can be performed with that access, or other such terms. One or more users might be associated with the customer, and thus can be able to access the resources per the customer account.

In various embodiments, the environment 306 may include various types of assets and resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant virtualized computing environment is often referred to as resource sharing, Web services, or "cloud computing," among other such terms and depending upon the specific environment and/or implementation. In this example the multi-tenant virtualized computing environment includes a plurality of resources 314 of one or more types. These types can include, for example, application servers operable to process instructions provided by a user or database servers operable to process data stored in one or more data stores 316 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 314 can submit a request that is received to an interface layer 308 of the multi-tenant virtualized computing environment 306. The interface layer can include application programming interfaces (APIs) or other exposed interfaces enabling a user to submit requests to the multi-tenant virtualized computing environment. The interface layer 308 in this example can also include other components as well, such as at least one Web server, routing components, load balancers, and the like. When a request to provision a resource is received to the interface layer 308, for example, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account, or is associated with a customer having an existing account, with the resource provider, where the account data may be stored in at least one data store 312 in the environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
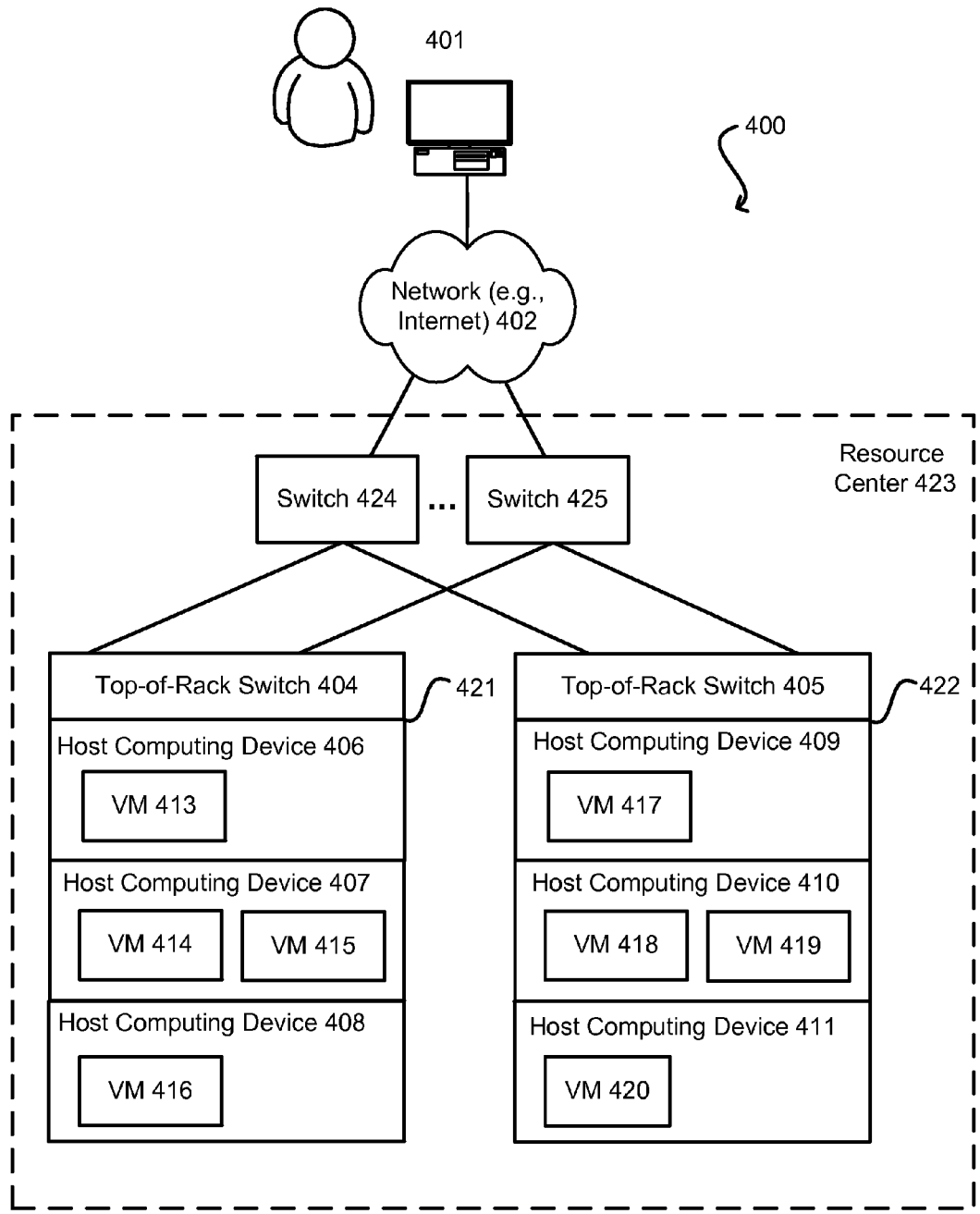
FIG. 4 illustrates an example of a resource center environment in which the multitenant environment may be implemented, in accordance with various embodiments.

FIG. 4 illustrates an example 400 of a resource center environment in which the multitenant environment may be implemented, in accordance with various embodiments. In the illustrated embodiment, a service provider (e.g., a cloud computing resource provider) can maintain one or more resource centers 423 (e.g., data centers, server farms, etc.) that store the physical resources (e.g., host computing devices, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419, 420) that have been provisioned for the customers of the service provider to execute the various applications and services on behalf of those customers. Each virtual machine can be provisioned with its own operating system (OS) including a kernel, drivers, process management and the like. The host computing devices may also store other digital assets of the user, as previously described, including but not limited to multimedia, documents and data of the principal of the account.

Figure 5A:
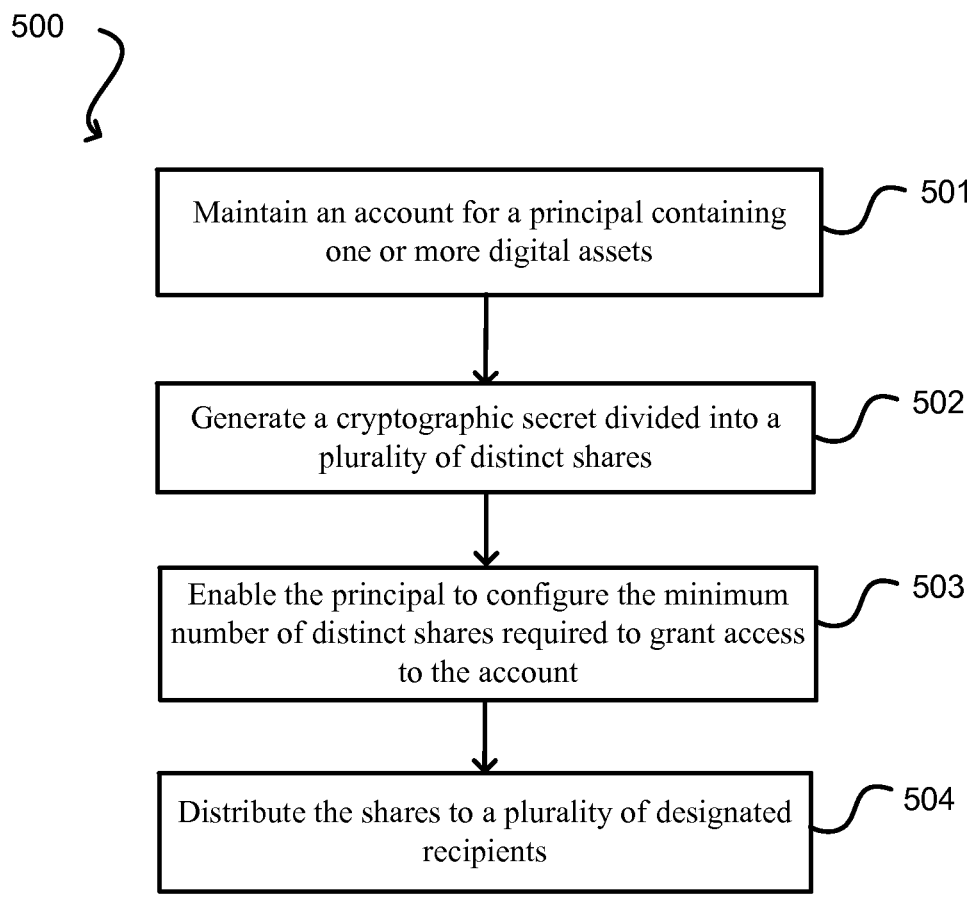
FIG. 5A illustrates an example process for enabling a principal to configure the account for asset transfer events, in accordance with various embodiments.

FIG. 5A illustrates an example process 500 for enabling a principal to configure the account for asset transfer events, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the service provider maintains an account for a principal. The account contains one or more digital assets of the user. The digital assets may be accessible by the user over a network connection, such as over the Internet. In operation 502, a cryptographic secret is generated. The cryptographic secret is divided into a plurality of distinct shares. In some embodiments, the principal of the account may specify how many total shares the secret should be divided into. In other embodiments, the total number of shares is determined by the service provider.

In operation 503, the principal of the account specifies the minimum number of shares which will be required to obtain access to the account. This minimum number of shares may the same as or less than the total number of shares of the secret. For example, if the secret is divided into a total of 10 shares, the principal may specify that a minimum of 3 shares is required before granting access to the account and its resources.

Once the secret is divided, each share is distributed to a designated recipient, as specified by the principal of the account. For example, if the principal is a person, he or she may select several family members (e.g., parent, sibling, child, etc.). In some embodiments, the shares are encrypted with a private key of the recipient prior to being distributed to the recipient. In other embodiments, the shares are stored by the service provider on behalf of the recipient.

Figure 5B:
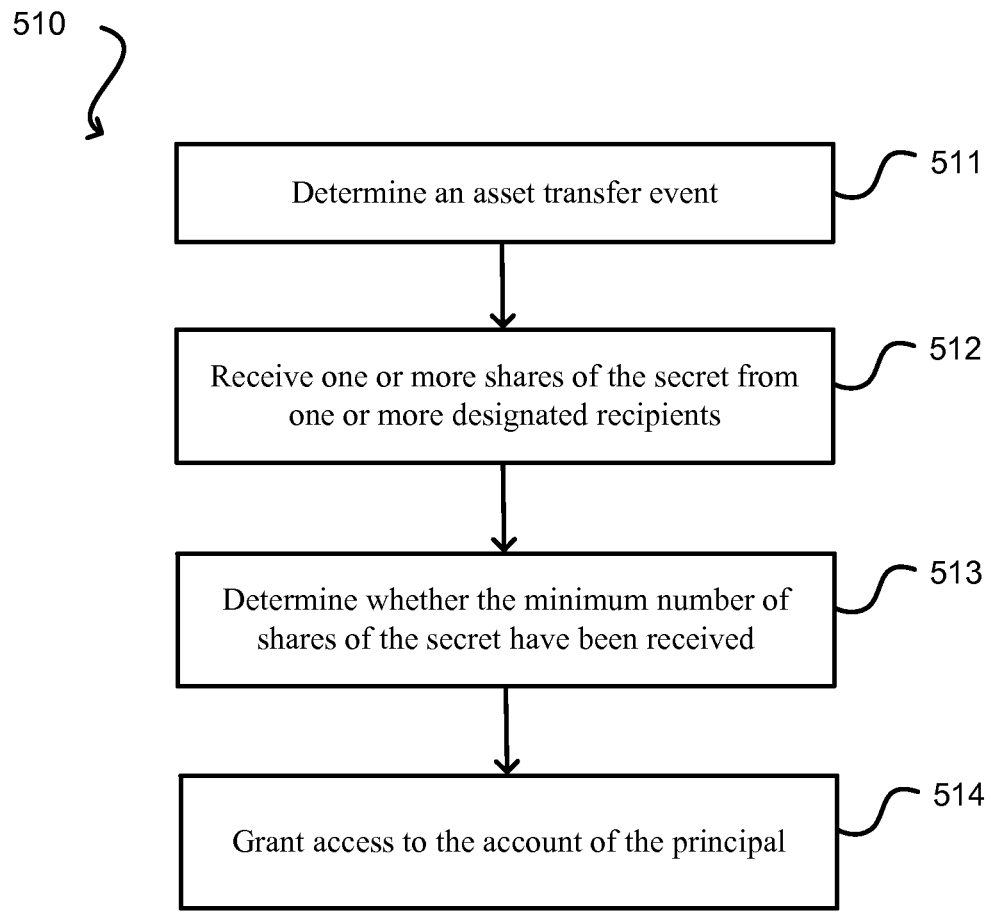
FIG. 5B illustrates an example of carrying out an asset transfer by the service provider for the account of the principal, in accordance with various embodiments.

FIG. 5B illustrates an example 510 of carrying out an asset transfer by the service provider for the account of the principal, in accordance with various embodiments. In operation 511, the service provider determines that an asset transfer event has occurred. For example, the service provider may determine that an individual owner of the account has died or that the business entity owner of the account has dissolved or has been acquired. The asset transfer event may be determined by a person evaluating various legal documents and other information or may be automatically detected using software, hardware or combination thereof.

In operation 512, the service provider receives one or more shares of the secret from the recipients. The shares may be received as part of a request submitted by the recipients to access the account of the principal or they may be received by the service provider in some other manner. In operation 513, the service provider determines whether the minimum number of shares have been received from the designated recipients. The minimum number of shares can be specified by the principal at the time of setting up the account, as previously described. In operation 514, if the service provider verifies that the required minimum number of shares has been received, it can grant access to the account of the principal and the digital assets stored therein.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
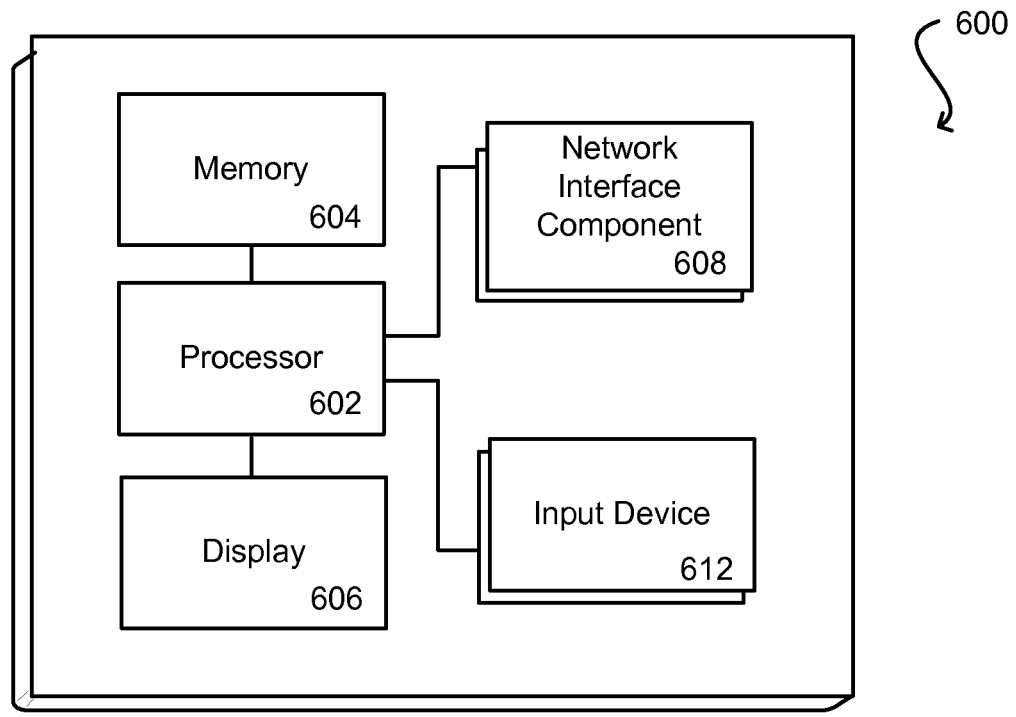
FIG. 6 illustrates a logical arrangement of a set of general components of an example computing device that can be utilized in accordance with various embodiments.
Figure 7:
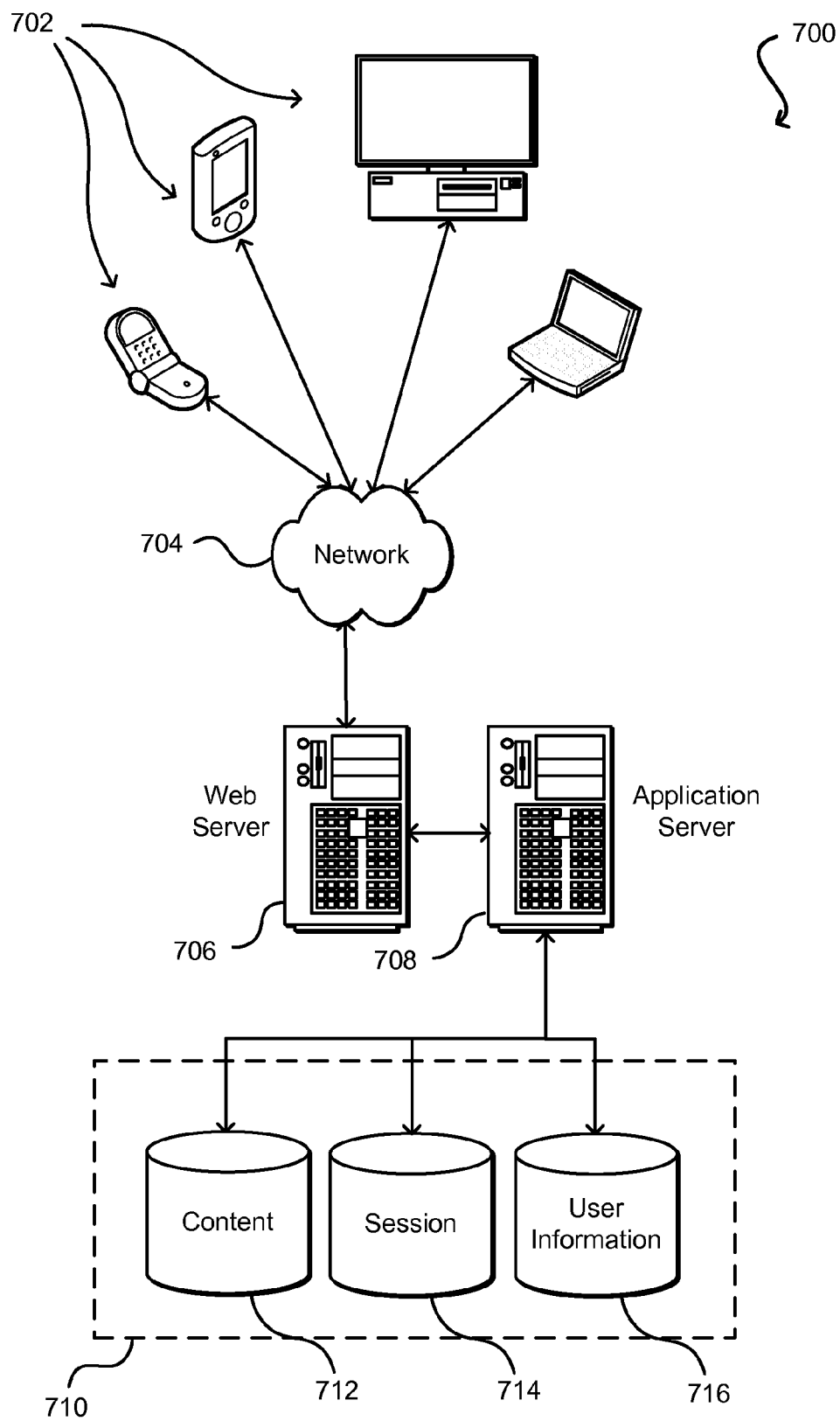
FIG. 7 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or readonly memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium comprising one or more sequences of instructions executed by one or more processors to:
   maintain, for a principal, an account containing one or more digital assets, the one or more digital assets being accessible over a network connection, wherein the principal includes a user that is an owner of the account;
   generate a cryptographic secret for controlling access to the account of the principal, the cryptographic secret divided into a plurality of distinct shares;
   receive configuration information, the configuration information specifying a minimum number of the distinct shares of the cryptographic secret that are required to grant access to the account;
   distribute the distinct shares to a plurality of recipients, each recipient receiving at least one distinct share of the cryptographic secret;
   revoke a share of the plurality of distinct shares without re-issuing the cryptographic secret;
   determine that a transfer event has occurred associated with the account of the principal, wherein the transfer event is a determination that the user is at least one of deceased or incapacitated;
   receive one or more distinct shares from the plurality of recipients; and
   in response to verifying that the minimum number of the distinct shares of the cryptographic secret have been received from the plurality of recipients, grant access to the account of the principal containing the one or more digital assets.

2. The non-transitory computer readable storage medium of claim 1, wherein distributing the distinct shares to a plurality of recipients further comprises:
   encrypting at least one distinct share with a private key of at least one recipient of the at least one distinct share; and
   distributing the encrypted at least one distinct share to the at least one recipient.

3. The non-transitory computer readable storage medium of claim 1, wherein the one or more sequences of instructions when executed cause the one or more processors to:
   distribute at least one of the distinct shares to an additional party responsible for monitoring access by the plurality of recipients, the at least one of the distinct shares needed for access to be granted to the account of the principal.

4. A computer implemented method, comprising:
   electronically storing for a principal associated with an account containing one or more digital assets, the one or more assets being accessible over a network connection, wherein the principal includes a business entity that is an owner of the account;
   generating a cryptographic secret for controlling access to the one or more assets, the cryptographic secret divided into a plurality of shares;
   receiving configuration information specified by the principal, the configuration information indicating a minimum number of the plurality of shares required to grant access to the one or more assets;
   distributing the distinct shares to a plurality of recipients, each recipient receiving at least one distinct share of the cryptographic secret;
   revoking a share of the plurality of shares without re-issuing the cryptographic secret;
   determining that a transfer event associated with the one or more assets has occurred, wherein the transfer event is one of an acquisition or dissolution of the business entity;
   receiving, from one or more parties, a request to access the one or more digital assets, the request including one or more shares of the plurality of shares;
   verifying that the minimum number of the shares has been received; and
   granting access to the one or more digital assets in response to verifying that at least the minimum number of shares has been received.

5. The computer implemented method of claim 4, wherein the configuration information corresponds to information provided by the principal, specified in a will, or specified in a transfer agreement.

6. The computer implemented method of claim 4, further comprising:
   distributing each share of the cryptographic secret to an individual recipient, wherein the individual recipient receives at least one share of the cryptographic secret.

7. The computer implemented method of claim 4, further comprising:

revoking a share of the cryptographic secret while maintaining the same minimum number of the shares to grant access to the one or more assets.

8. The computer implemented method of claim 4, wherein the one or more digital assets are associated with an account of the principal, and wherein granting access to the one or more assets further comprises transferring ownership of the account to one or more users in possession of the minimum number of shares.

9. The computer implemented method of claim 4, wherein receiving the request to access the one or more assets further comprises:
   initiating a timeout period;
   notifying the principal with a message indicating that the request to access the one or more assets has been received from the one or more parties; and
   in response to determining that no response has been received from the principal within the timeout period, granting access to the one or more assets if the minimum number of the shares has been received.

10. The computer implemented method of claim 9, further comprising:
    attempting to perform a financial transaction for at least one account associated with the principal during the timeout period; and
    in response to determining that the financial transaction has failed, granting access to the one or more digital assets if the minimum number of the shares has been received.

11. The computer implemented method of claim 4, further comprising:
    encrypting each share with a private key; and
    distributing the encrypted share to the recipient hat owns the private key.

12. The computer implemented method of claim 4, further comprising:
    enabling at least one of the principal or a related party to perform at least one of changing the number of shares or changing the minimum number.

13. A computing device, comprising:
    at least one processor; and
    memory including instructions that, when executed by the at least one processor, cause the computing device to:
       electronically store one or more digital assets for a principal, the one or more assets being accessible over a network connection, wherein the principal includes a business entity that is an owner of the account;
       generate a cryptographic secret for controlling access to the one or more assets, the cryptographic secret divided into a plurality of shares;
       receive configuration information specified by the principal, the configuration information indicating a minimum number of the shares required to grant access to the one or more assets;
       distribute the distinct shares to a plurality of recipients, each recipient receiving at least one distinct share of the cryptographic secret;
       revoke a share of the plurality of shares without re-issuing the cryptographic secret;
       determine that a transfer event associated with the one or more assets has occurred, wherein the transfer event is one of an acquisition or dissolution of the business entity;
       receive, from one or more users, at least one request to access the one or more digital assets, the at least one request including one or more shares of the plurality of shares;
       verify that at least the minimum number of the shares has been received; and
       grant access to the one or more digital assets in response to verifying that at least the minimum number of shares has been received.

14. The computing device of claim 13, wherein the one or more assets are associated with an account of the principal, and wherein granting access to the one or more digital assets further comprises transferring ownership of the account to one or more users in possession of the at least the minimum number of shares.

15. The computing device of claim 13, wherein receiving the request to access the one or more assets further comprises:
    initiate a timeout period;
    notify the principal with a message indicating that the request to access the one or more assets has been received from the one or more users; and
    in response to determining that no response has been received from the principal during the timeout period, grant access to the one or more digital assets if the minimum number of the shares has been received.

* * * * *